Inventor
WALTER MILLER
JAMES L. D. MORRISON
By J. B. Dickman Jr
Attorney

July 14, 1953 W. MILLER ET AL 2,645,497

RECORD CHANGER HEAD AND TONE ARM ASSEMBLY

Filed Oct. 17, 1946 3 Sheets-Sheet 2

Inventor

WALTER MILLER

JAMES L.D. MORRISON

By J.B. Dickman Jr.

Attorney

July 14, 1953 W. MILLER ET AL 2,645,497

RECORD CHANGER HEAD AND TONE ARM ASSEMBLY

Filed Oct. 17, 1946 3 Sheets-Sheet 3

INVENTOR.
WALTER MILLER
JAMES L.D. MORRISON

BY J.B. Dickman Jr.
ATTORNEY

Patented July 14, 1953

2,645,497

UNITED STATES PATENT OFFICE 2,645,497

RECORD CHANGER HEAD AND TONE ARM ASSEMBLY

Walter Miller and James L. D. Morrison, Benton Harbor, Mich.

Application October 17, 1946, Serial No. 703,886

3 Claims. (Cl. 274—10)

The present invention relates to a novel record changing mechanism, and more specifically to a record ejecting head mounted on the same post as the tone arm, for operation by the same control shaft.

This invention relates to record changers of the type disclosed in prior Patent 2,487,771.

An object of the present invention is to improve the construction of record changer heads for shifting the bottom record in a magazine stack on an offset spindle, to drop it to the turntable at the proper time in the sequence of operations of a record changer mechanism.

Another object of the present invention is to simplify the operation of record changer heads of the above or any other type, by mounting them on the tone arm post for simultaneous operation of the head and tone arm by the same shaft, mounted in said post, as it turns through successive angles, so as to drop the record after the tone arm has turned clear of the turntable, and to provide resilient means for returning the tone arm to its starting position over the record on the turntable after the new record has been dropped thereon.

A still further object of the present invention is to combine the tone arm and the record changer head posts into one post, having means therein for operating both devices.

A still further object of the present invention is to mount a record changer head on the tone arm post and provide means for operating it from the tone arm operating shaft through a lost-motion connection so as to cause the tone arm to move beyond the periphery of the records on the turntable before the record changer head is operated to change the record.

Other and more specific objects will become apparent in the following detailed description of an illustrative form of my invention, having reference to the accompanying drawings, wherein.

Figure 1:
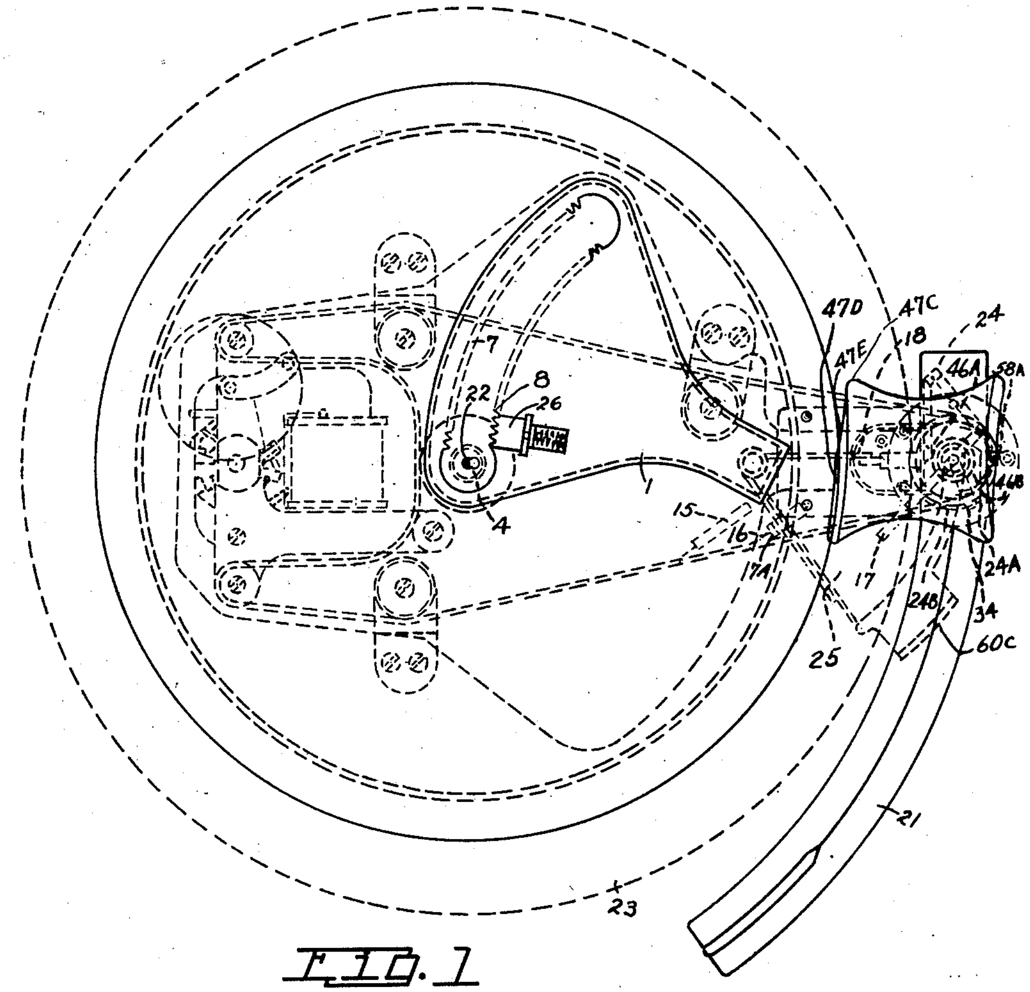
Figure 1 is a plan view of the tone arm post supporting the record changer head and its operating mechanism in accordance with the present invention.
Figure 2:
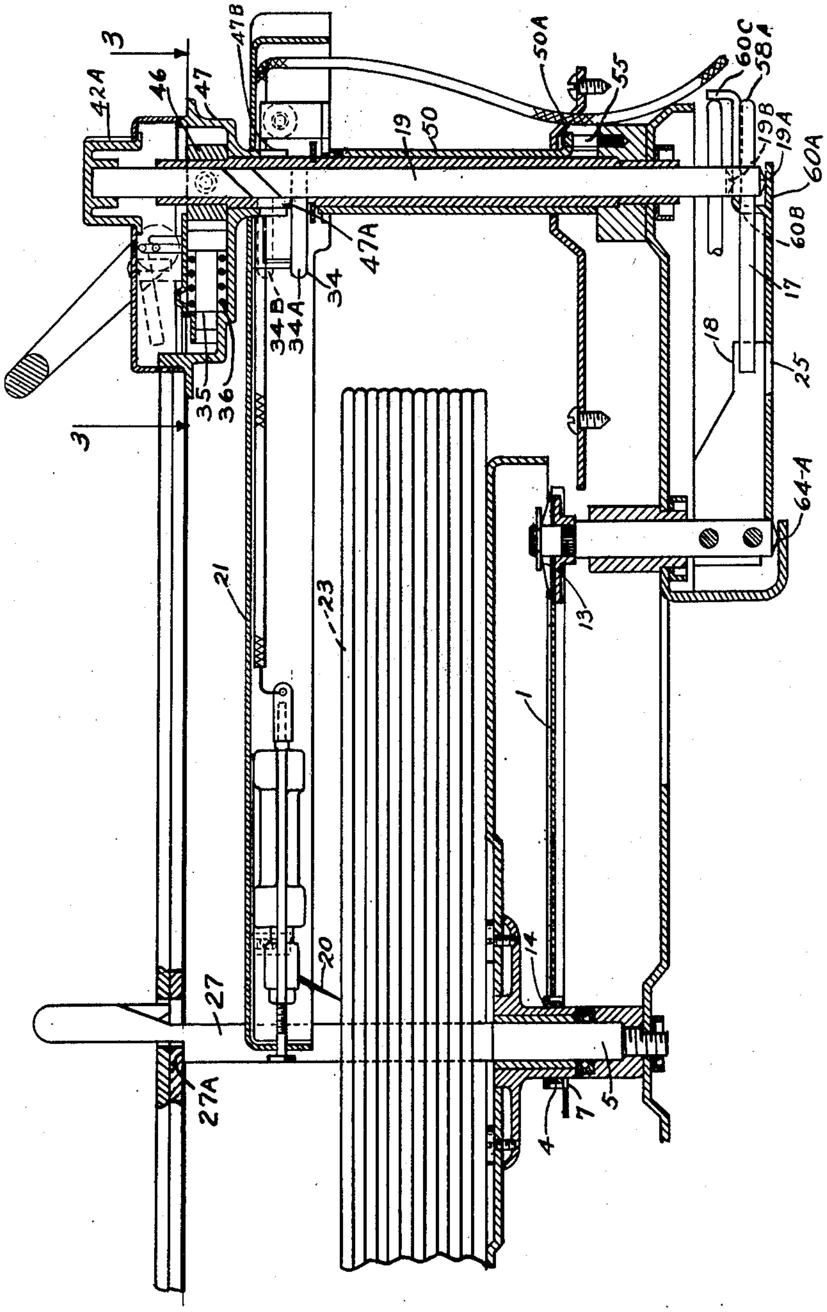
Figure 2 is a sectional view showing the operating shaft and its lost motion connection to the head operating mechanism.
Figure 3:
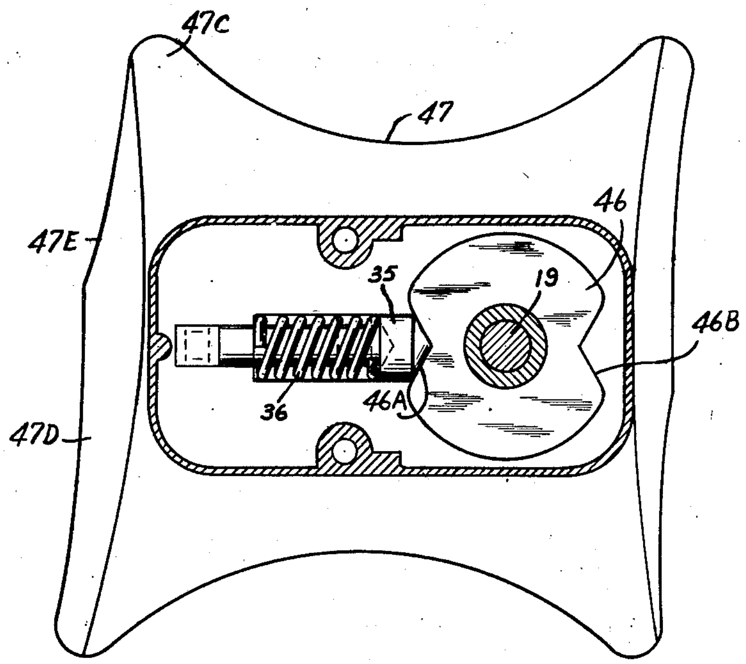
Figure 3 is a detail view partly in section of the changer head, taken on the line 3—3 of Figure 2.

The record changer head shown for the purposes of illustration is a novel oscillating type for use in connection with an offset spindle type of record stack holder. It is to be understood, however, that other types of heads may be similarly combined with the tone arm post for operation by a common operating shaft therein, whether they merely oscillate or turn completely around.

In the illustrated form, the operation is accomplished as follows: When the cycle has been started, as explained in our copending parent application, filed September 4, 1946, Serial No. 694,746, now Patent No. 2,487,771, of which this application is a continuation in part, the rising cam face on the lift arm 25 causes the shaft 19 to move from its lower position 19A to its upper position 19B, and the cross pin 34 is thus moved from its lower position 34A to its upper position 34B. When this occurs the tone arm 21 is raised completely off the record 23 and is in a position ready to be turned out beyond the records, so that a new record is free to drop past it.

The pin 34 moves up into a slot 47A in the ejector head 47. As soon as the shaft 19 has reached the top of the cam 60B the projection 60C strikes the end 58A of the cross pin 17; this drives the pin 34 against a projection 24A extending downwardly from a hinge 24 which is riveted or otherwise fixed to the tone arm 21.

Since a counter-clockwise turning motion is imparted to the shaft 19 by the projection 60C on cam 60A through the pin 17, the pin 34 is moved in a counter-clockwise direction, and the tone arm 21 is turned out beyond the edge of the records. When the tone arm has reached a position where the needle is just over the starting grooves on the record the pin 34 comes up against the edge of the slot 47A. This causes the head 47 to move in a counter-clockwise direction along with the tone arm.

Shortly before the tone arm has reached the end of its counter-clockwise travel, the shoulder 47C contacts the edge of the lowest record in the stack forcing it forward over the edge of the ledge 27A on the spindle 27. Since the radius of the lip 47D is partially cut away as shown, along the line 47E, the bottom record is free to drop straight down while the remaining records are supported by the shoulder 47C which is a little less than the thickness of one record higher than the lip 47D upon which the records normally rest.

When the tone-arm is far enough beyond the edge of the records to prevent a falling record from striking it, it is restrained from any further outward motion by the stop pin 55 and the projection 50A on the tone arm shaft 50. This stop is necessary because the pin 34 might come up against some part of the radius 24B and not resting against the stop 24A. In that case, friction would tend to hold pin 34 and radius 24B together until the tone arm was stopped by projection 50A and stop pin 55, then pin 34 would slide along the radius 24B until it met the stop 24A, at which time cam 60C would have completed its full travel and was ready to start back again.

The ejector head 47 is resiliently held in either the 10'' record or 12'' record position by means of the V grooves 46A and 46B, the latch 35, and the latch spring 36. When the pin 34 pushes against the edge of the slot 47A, thus turning the ejector head 47, the latch 35 is moved backward against the force of the spring 36 as it is forced up the side of the V groove 46A. Consequently, when the member 60C starts to return to its starting position, the pin 34 is allowed to turn back in a clock-wise direction, thus allowing the latch 35 to return the head 47 to its normal position. Since, in this position, the needle, as mentioned above, is over the starting grooves in the record, the tone arm is lowered in the proper position to start playing.

As indicated above, after the record changing operation is initiated by mechanism shown in dotted lines in Fig. 1, and as fully described in the copending application previously referred to, the first effect is the raising of the shaft 19 by movement of the rising portion 60B of cam 60A. The pin 34 will strike the radial edge of member 24 at a point spaced from its stop 24A a distance depending on the position of the tone arm over the record table at the time when the charging operation is initiated. As the pin 34 strikes this lower edge 24A it raises the tone arm on its hinge to lift the needle off the record. When shaft 19 is fully lifted to the top of cam portion 60B, the projection 60C strikes pin 17 and turns shaft 19, whereupon pin 34 by friction with edge 24A turns the tone arm outwardly of the turntable in its raised position. During this turning movement pin 34 takes up its lost motion in slot 47A, whereupon the head 47 begins to turn carrying its latch pin along so that it rides up one side of V groove 46A in the stationary block 46 against the pressure of spring 36 which normally maintains the head in its normal record supporting position with the edge of the lowermost record in the magazine stack resting fully on the lip 47D.

As the head 47 is turned, the shoulder 47C pushes the lowermost record in the stack while slipping under the edge of the record above it to support the rest of the stack. When the cut away portion 47E of the lip 47D clears the lowermost record, it is pushed off the ledge 27A of the spindle 27 at the center, and drops down to the turntable. The tone arm at this time has been turned clear of the turn table and out of the way of the dropping record, but has been stopped in its outward travel by the fixed pin 55 striking the projection 50A on the tone arm sleeve 50, while the pin 34 has moved along the edge 24A up to the stop 24A at the end of the turning movement. The stop 24A serves as a positive means of turning the tone arm out of the way of the dropping record and to its proper position relative to the head 47, and the stop pin 55 serves to hold the tone arm until pin 34 reaches this stop at the end of the turning operation, so that upon reversal of the turning movement, the spring 36 will automatically bring the tone arm into its starting position over the record before cam 60A lowers the tone arm. This relative position may obviously be changed to suit the size of records used, by changing the relative setting of slot 47A and stop 24A. This is done automatically in the present device, when the head 47 is turned 180°. The slot 47B, having the proper setting with relation to pin 34, is presented for operation therewith to provide the proper relation for the larger 12'' records.

As already mentioned, other types of record changer heads may be combined in a similar manner with the tone arm post, and various obvious modifications in the form and arrangement of parts may be made, without departing from the spirit and scope of the invention, as defined in the appended claims.

What is claimed is:

1. In a record changer of the type having a spindle extending upwardly from a turn table in alignment with the axis thereof, a supporting ledge carried by the spindle and extending laterally from one side thereof in vertically spaced relation to the turn table and upon which the center portions of a stack of record disks is supported above the turn table, a tone arm mounted adjacent the turn table to move above a vertical axis toward the axis of the turn table during the playing of a record and to shift vertically and move away from and beyond the edge of the turntable upon completing the playing of the record, a plate in spaced relation to the spindle and cooperating with the ledge for supporting the stack of record disks and for shifting the bottommost record disk in the stack of record disks off of the supporting ledge so as to cause it to fall into playing position on the turntable, said plate having a shoulder thereon and mounted above the tone arm to move in an arcuate path about the vertical axis toward and away from the spindle, and means carried by the tone arm and operatively connected to the shoulder for swinging said shoulder in said arcuate path toward the spindle as the tone arm moves beyond the edge of the turn table and engaging the bottommost record disk in the stack of record disks and propelling it off of the supporting ledge.

2. The structure defined in claim 1 in which a lip is carried by the shoulder for movement therewith from a position clear of a propelled disk to a position beneath the stack of record disks.

3. The structure defined in claim 1 in which the means for swinging the shoulder includes a cam carried by the shoulder and rotatable therewith about the vertical axis, and a pin carried by the tone arm for movement therewith, said pin extending perpendicularly from the vertical axis and engaging the cam when the tone arm shifts vertically.

WALTER MILLER.
JAMES L. D. MORRISON.

References Cited in the file of this patent

UNITED STATES PATENTS

| Number | Name | Date |
|---|---|---|
| 2,090,746 | Compare | Aug. 24, 1937 |
| 2,352,331 | Leline | June 27, 1944 |
| 2,484,775 | Zandelin et al. | Oct. 11, 1949 |
| 2,536,432 | Faulkner | Jan. 2, 1951 |

FOREIGN PATENTS

| Number | Country | Date |
|---|---|---|
| 281,003 | Great Britain | Nov. 23, 1927 |